(12) United States Patent
Novotny

(10) Patent No.: US 6,172,870 B1
(45) Date of Patent: Jan. 9, 2001

(54) SPRING CLIP ATTACHMENT DEVICE

(75) Inventor: Joseph F. Novotny, Sioux City, IA (US)

(73) Assignee: Gateway 2000, Inc., North Sioux City, SD (US)

( * ) Notice: Under 35 U.S.C. 154(b), the term of this patent shall be extended for 0 days.

(21) Appl. No.: 09/076,959

(22) Filed: May 13, 1998

(51) Int. Cl.[7] .............................. G06F 1/16; H05K 5/02
(52) U.S. Cl. ........................ 361/685; 361/683; 361/724
(58) Field of Search .................................. 361/685, 683, 361/724–727; 248/222.12, 225.11

(56) References Cited

U.S. PATENT DOCUMENTS

| | | | |
|---|---|---|---|
| 4,960,384 | * 10/1990 | Singer et al. | 361/685 |
| 5,566,383 | 10/1996 | Gildea et al. | 361/685 |
| 5,680,293 | 10/1997 | McAnally et al. | 361/685 |
| 5,717,570 | * 2/1998 | Kikinis | 361/685 |
| 5,808,864 | 9/1998 | Jung | 361/685 |
| 5,828,547 | * 10/1998 | Francovich et al. | 361/685 |

* cited by examiner

Primary Examiner—Lynn D. Feild
(74) Attorney, Agent, or Firm—Schwegan, Lundberg, Woessner & Kluth, P.A.; Joseph H. Lee

(57) ABSTRACT

A computer component, such as a hard disk drive, is provided with a spring clip assembly. The spring clip has a spring bracket and a plurality of tabs for engaging with a divider panel disposed within a chassis of a computer. The plurality of tabs guide the hard disk drive into place as the hard disk drive is installed. A support bracket coupled with the hard disk drive couples with slots on a power supply housing, and anchors the hard disk drive as the spring bracket assembly engages with the divider panel. A release mechanism is provided with the spring clip assembly, thereby allowing for easy removal and installation of the hard disk drive.

21 Claims, 6 Drawing Sheets

SPRING CLIP ATTACHMENT DEVICE

FIELD OF THE INVENTION

The present invention relates generally to attachment features for electrical components. More particularly, it pertains to spring clip attachment of components for a computer.

BACKGROUND OF THE INVENTION

As the development of computers and computer components occurs at a rapidly increasing pace, computers and their components become obsolete more quickly. As a result, conventional computers are designed to allow for individual components to be changed or upgraded by a computer user. Currently, many individual components are available for upgrading a computer. As a result, computer users often purchase and install updated components and upgrade their computers.

While components are now readily available for consumers to purchase, installation of these components can be a time consuming process. In addition, the components require tools to install them into the computer, which can add time and frustration for the computer user during the upgrade process.

As disk drive storage capacity increases, software developers write software applications that use more and more disk drive space, thereby limiting disk drive space. Computer users frequently want to upgrade their computer with a larger capacity hard disk drive. Currently, the hard disk drive is secured to the frame with screws, as illustrated in FIG. 1. For personal computers, a rigid drive frame is provided within a chassis. A hard drive is placed into the drive frame and held with screws. On one side of the frame, screws are disposed through the frame and into the drive. To upgrade a hard disk drive 100 secured using this set up, the computer user must remove several screws 110 using a tool before removing the hard drive from the frame 120. To install a new disk drive, the user places a new hard drive into place and inserts a plurality of screws through the frame and into the hard drive. A tool is used to install the screws into the hard drive. The small screws are disposed in a relatively small working area which causes difficultly when removing the screws and the need to work with a tool. Additionally, removing several screws every time the component is installed or removed is time consuming and frustrating for the operator.

Accordingly, what is needed is a better way to remove and install components in a personal computer. What is further needed is a way to remove components from the computer without use of additional tools.

SUMMARY OF THE INVENTION

A removable computer component assembly is provided for use with personal computers. The computer component has a support bracket with support tabs on a first surface, and a spring clip assembly on a second surface. In one embodiment, the support tabs have round edges. The spring clip assembly has a spring bracket which has a spring bias away from the first surface of the computer component. In another embodiment, the spring clip assembly also includes a plurality of tabs each having a spring bias.

In one embodiment, a hard disk drive is provided with an anchor bracket and a spring clip assembly. The spring clip assembly includes a spring bracket having a spring bias away from the hard disk drive and a plurality of tabs having a spring bias. In another embodiment, the spring clip assembly includes a release mechanism. The release mechanism includes a pull ring rotatably coupled with the spring bracket.

In yet another embodiment, a computer is provided having a chassis, a divider panel, a hard disk drive, and a fan. The hard disk drive has an anchor bracket and a spring clip assembly. The divider panel is disposed between two side surfaces of the chassis, and has a plurality of attachment features. The attachment features, which are integral with the divider panel, couple with the spring clip assembly on the hard disk drive. The attachment features include a spring bracket cut out for receiving a spring bracket of the spring clip assembly. The attachment features also include flanges for guiding and engaging a plurality of tabs of the spring clip assembly. A release mechanism coupled with the spring clip assembly facilitates easy removal of the hard disk drive from the computer without the use of additional tools.

The chassis of the computer is provided with slots for engaging the anchor bracket of the hard disk drive, and for allowing the fan to draw air over the heat generating components and out of the computer. Alternatively, the slots can be incorporated in other locations of the computer. In one embodiment, the computer has a power supply with a power supply housing. The power supply housing has slots therein for engaging the anchor bracket of the hard disk drive.

Advantageously, the hard disk drive can be easily removed from the computer without the use of any hand tools. Since the drive is easily removed and securely stored away from the computer, additional security can be provided against theft of information. The spring clip assembly self-aligns during assembly and provides a natural pull direction and method for removal. Since the spring assembly can be operated with one hand and with limited force, the hard disk drive could be used by computer operators with limited dexterity or limited grip strength.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

In the drawings, where like numerals describe like components throughout the several views.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

The present invention relates to a structure and method for securing a hard disk drive to a chassis of a personal computer. The structure, as will be further discussed below, includes a bracket secured to the hard disk drive. The hard disk drive also has additional structure on the opposite side of the drive for supporting the hard disk drive. The bracket and the additional structure couple the chassis and a divider panel secured to the chassis. The structure facilitates easy removal of a hard disk drive from the computer without the use of additional tools. Although a hard disk drive is described, the structure could be incorporated with other components, such as power systems and media drives, and is considered within the scope of the invention.

Figure 1:
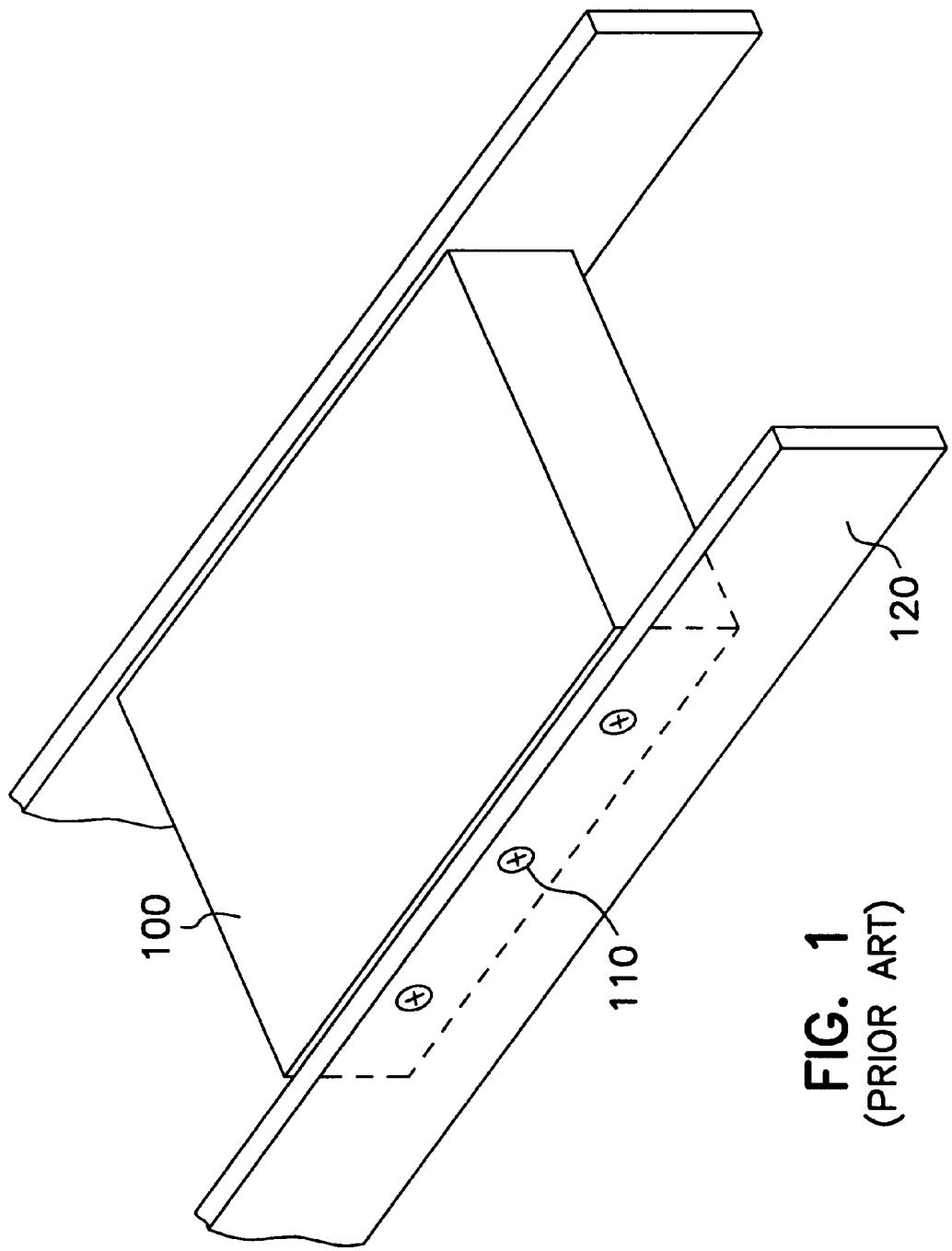
FIG. 1 is a perspective view illustrating a prior art hard drive assembly.
Figure 2:
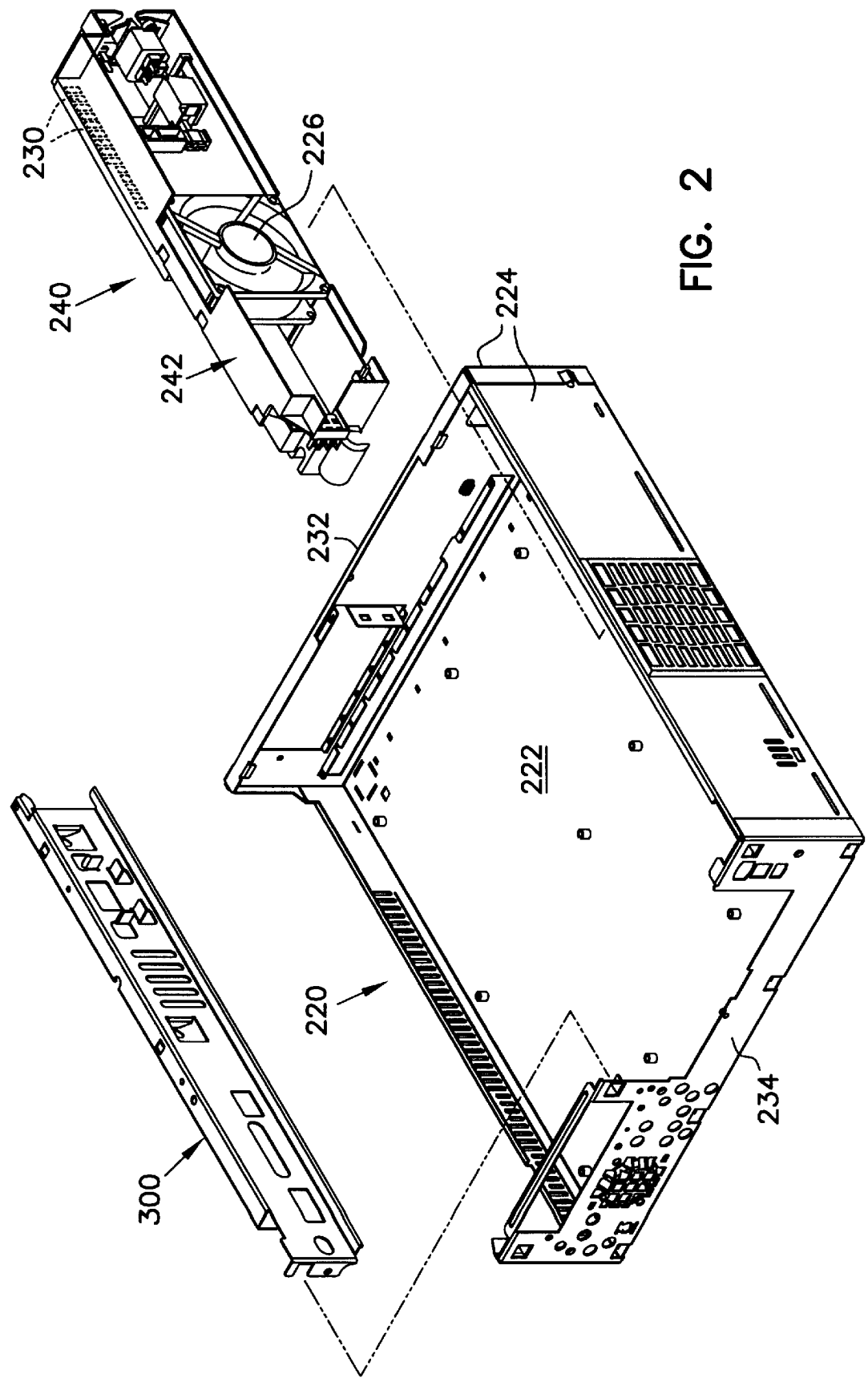
FIG. 2 is a perspective view illustrating a chassis constructed in accordance with one embodiment of the present invention.

FIG. 2 illustrates a chassis 220 for use with a personal computer. Formed from a substantially rigid material, the chassis 220 provides a support structure for many components of the computer. For instance, in one embodiment, the chassis 220 is formed from a metal material. Alternatively, the chassis 220 has a metal structure with a plastic coating thereover. The chassis 220 also provides protection to the components from electromagnetic interference or harsh elements of the environment.

The chassis 220 is comprised of a bottom surface 222 and has a plurality of side surfaces 224, including first and second side surfaces 232, 234. In one embodiment, a power supply 240 is proximate to one of the side surfaces 224, as shown in FIG. 2. Alternatively, the power supply 240 could be located in other locations within the chassis 220. The power supply 240 has a power supply housing 242 disposed thereover. Also disposed in the power supply housing 242 is a fan 226. The fan 226 draws air over the components within the chassis 220 and expels the heated air from the chassis 220, thereby cooling the internal components and the power supply 240. The power supply housing 242 has a plurality of slots 230 formed therein, and allow for air to be drawn out of the chassis 220 by the fan 226. The slots 230 also couple with a portion of the hard disk drive, as will be further discussed below. First and second side surfaces 232, 234 provide support and attachment features for coupling with a divider panel 300. Divider panel 300 is shown in more detail in FIG. 3.

The divider panel 300 is generally an elongate structure extending from a first end 312 to a second end 314. The divider panel 300 is defined in part by a top surface 316 and a bottom surface 318. The terms "top" and "bottom" are used for descriptive purposes only and are not intended to limit the orientation of the divider panel 300 in any manner. Formed from a substantially rigid material, the divider panel 300 provides a support structure for the computer, and structure for coupling with other components of the computer.

The bottom surface 318 of the divider panel 300 faces toward the base surface 222 of the chassis 220 when the divider panel 300 is assembled with the chassis 220. The first and second ends 312, 314 are for coupling with the first and second side surfaces 232, 234 of the chassis 220, shown in FIG. 2. The length of the divider panel 300 between the first and second ends 312, 314 is sufficient to attach the first and second ends 312, 314 to the side surfaces 232, 234 of the chassis 220.

An attachment panel 330 is disposed between the top surface 316 and the bottom surface 318 of the divider panel 300. The attachment panel 330 is substantially planar, although other configurations are appropriate for use with the present invention. The attachment panel 330 has a plurality of slots 332 disposed therein. The slots 332 facilitate air flow through the chassis 220, shown in FIG. 2, and also provide alternative attachment structure for other components of the computer. In addition, the attachment panel 330 has spring bracket attachment features 340 integral therewith.

Figure 3:
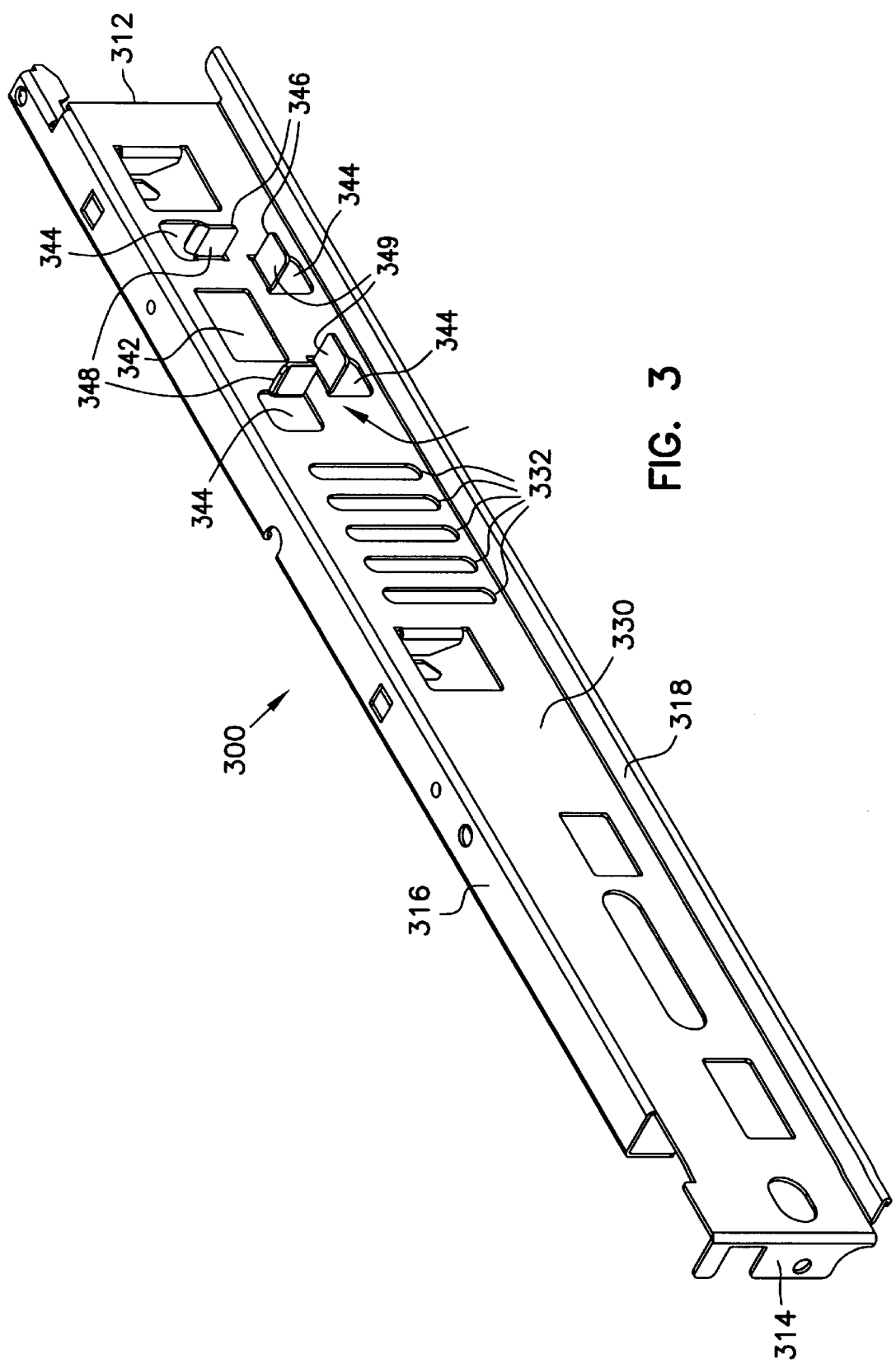
FIG. 3 is a perspective view illustrating a divider panel constructed in accordance with one embodiment of the present invention.

As illustrated in FIG. 3, the attachment features 340 include tab cut outs 344 and a spring bracket tab 342. The spring bracket, in one embodiment, is rectangular shaped and is larger than the tab cutouts 344. The tab cut outs 344 are each generally square shaped, although other shapes could be incorporated with the present invention. The tab cutouts 344 also include flanges 346 coupled therewith. In one embodiment, the flanges 346 are formed by cutting the material for the tab cut outs 344, and folding the flanges 346 away from the cut outs 344. A first set of flanges 348 are provided on the attachment panel 330 such that they are generally perpendicular with the bottom surface 318 and generally perpendicular to the attachment panel 330 of the divider panel 300. A second set of flanges 349 are provided on the attachment panel 330 such that they are generally parallel to the bottom surface 318 and generally perpendicular to the attachment panel 330 of the divider panel 300. The first and second set of flanges 348, 349 are for coupling with a spring clip assembly 400 (FIG. 5) of the hard disk drive 500 (FIG. 5), and help to guide the spring clip assembly 400 into position.

Figure 4:
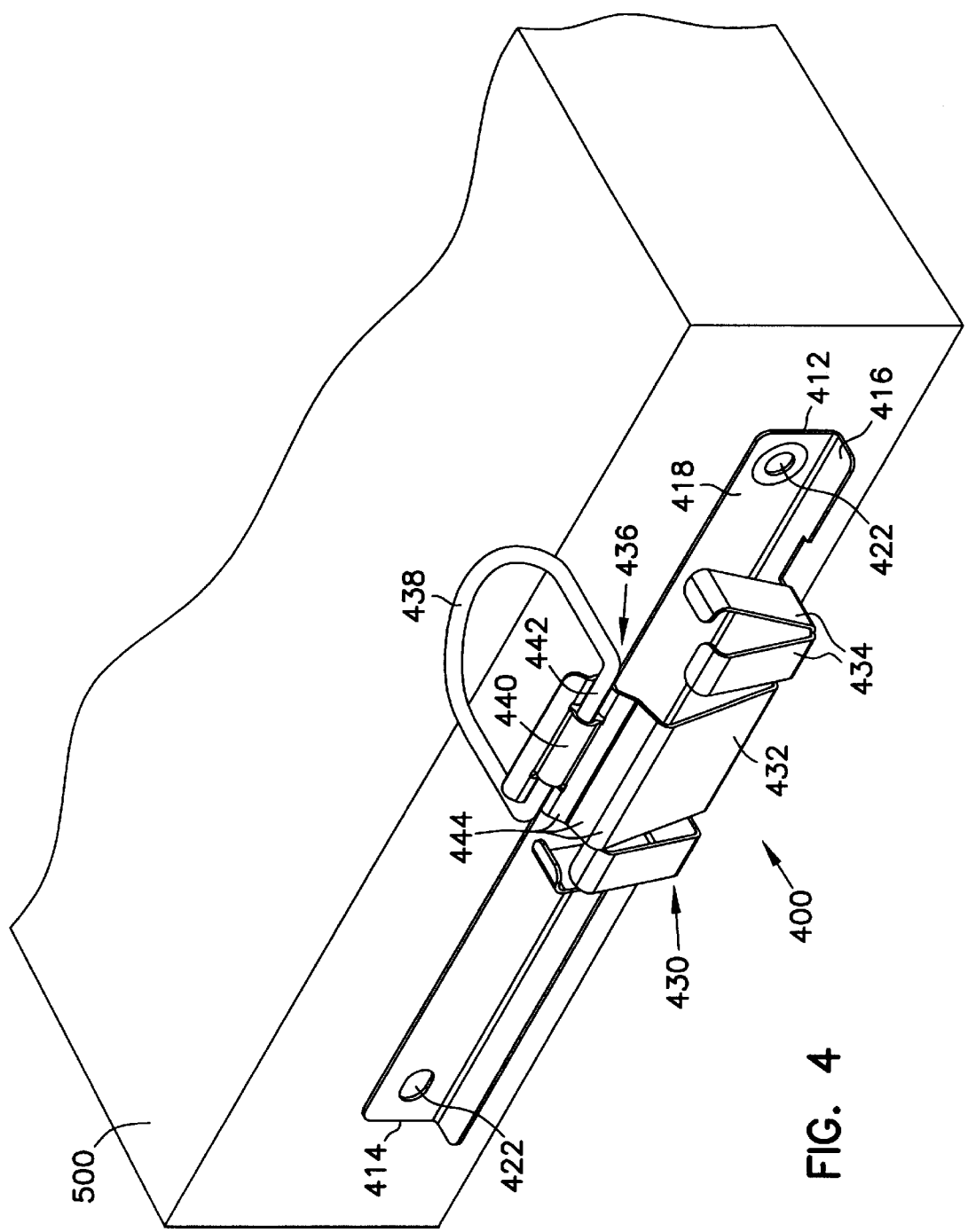
FIG. 4 is a perspective view illustrating a spring clip assembly constructed in accordance with another embodiment of the present invention.

FIG. 4 illustrates the spring clip assembly 400 for use with the present invention. The spring clip 400 has generally an elongate structure and extends from a first end 412 to a second end 414. The spring clip 400 has a first bracket portion 416 and a second bracket portion 418 which, in one embodiment, form a generally "L"-shaped structure. Disposed in the second bracket portion 418 is at least one aperture. In one embodiment, two apertures 422 are disposed in the second bracket portion 418. The apertures 422 are for receiving threaded fasteners, such as screws, therethrough. The apertures in the spring clip assembly 400 are spaced to correspond to standard mounting openings on a disk drive. The fasteners are used to couple the spring clip 400 with the hard disk drive 500. Although threaded fasteners are described, other attachment methods, such as clips or adhesive, could be used to couple the spring clip assembly 400 with the hard disk drive 500 and are considered within the scope of the invention.

The spring clip 400 also has clip features 430, which include a spring bracket 432 and a plurality of tabs 434. The spring bracket 432 and the plurality of tabs 434 extend from the first bracket portion 416. The spring bracket 432 has a spring bias away from the second bracket portion 418. In one embodiment, the spring bracket 432 has a plurality of folds 444. In addition, the spring bracket 432 is sized is to be received within the spring bracket cut out 342 of the divider panel 300 (FIG. 3), and at least one of the plurality of folds 444 engage an edge surface of the spring bracket cut out 342.

In another embodiment, the spring bracket 432 has a release mechanism 436. The release mechanism 436, in one embodiment, has a generally planar surface which can be activated using a finger or thumb to depress on the planar surface. In another embodiment, the release mechanism 436 includes a pull ring 438 hingedly coupled with the release mechanism 436. The release mechanism 436 has a deformed portion 440 forming an aperture 442 therein, which receives the pull ring 438 therethrough. In one embodiment, the pull ring 438 is formed from a loop of material. For example, the pull ring 438 can be formed from a 0.060 inch diameter wire formed in a ring shape. Other structures can be coupled with the release mechanism 436 for assisting a computer user in disassembly the hard disk drive 500 using the spring clip assembly 400.

Figure 5:
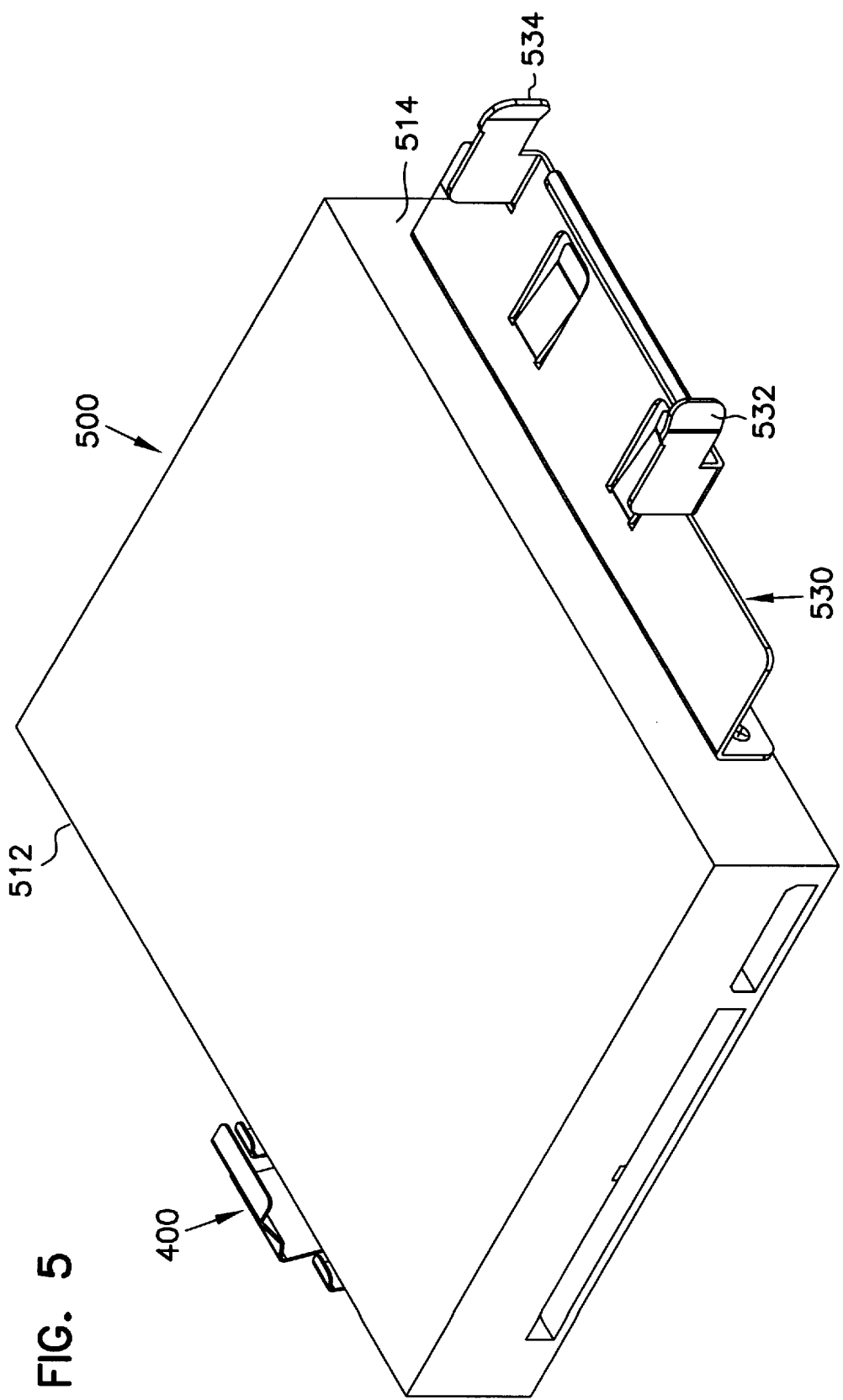
FIG. 5 is a perspective view illustrating a hard disk drive constructed in accordance with one embodiment of the present invention.

FIG. 5 shows the hard disk drive 500, which has a first surface 512 and a second surface 514. The first surface has the spring clip assembly 400 coupled therewith. A support bracket 530 is coupled with the second surface 514. The support bracket 530, in one embodiment, is coupled with the hard disk drive 500 with threaded fasteners, such as screws. Alternatively, the support bracket 530 could be secured to the second surface 514 in other manners known in the art.

The support bracket 530 is for coupling with slots 230 on the power supply housing 242, shown in FIG. 2. The support bracket 530 has first and second support tabs 532, 534 which are inserted into the slots 230 when the hard disk drive 500 is assembled into the computer. In one embodiment, the first and second support tabs 532, 534 have curved edges for facilitating coupling with the slots 230. The support bracket 530 acts as an anchor mechanism to hold the hard disk drive in place while the hard disk drive 500 is installed using the spring clip assembly 400.

Figure 6:
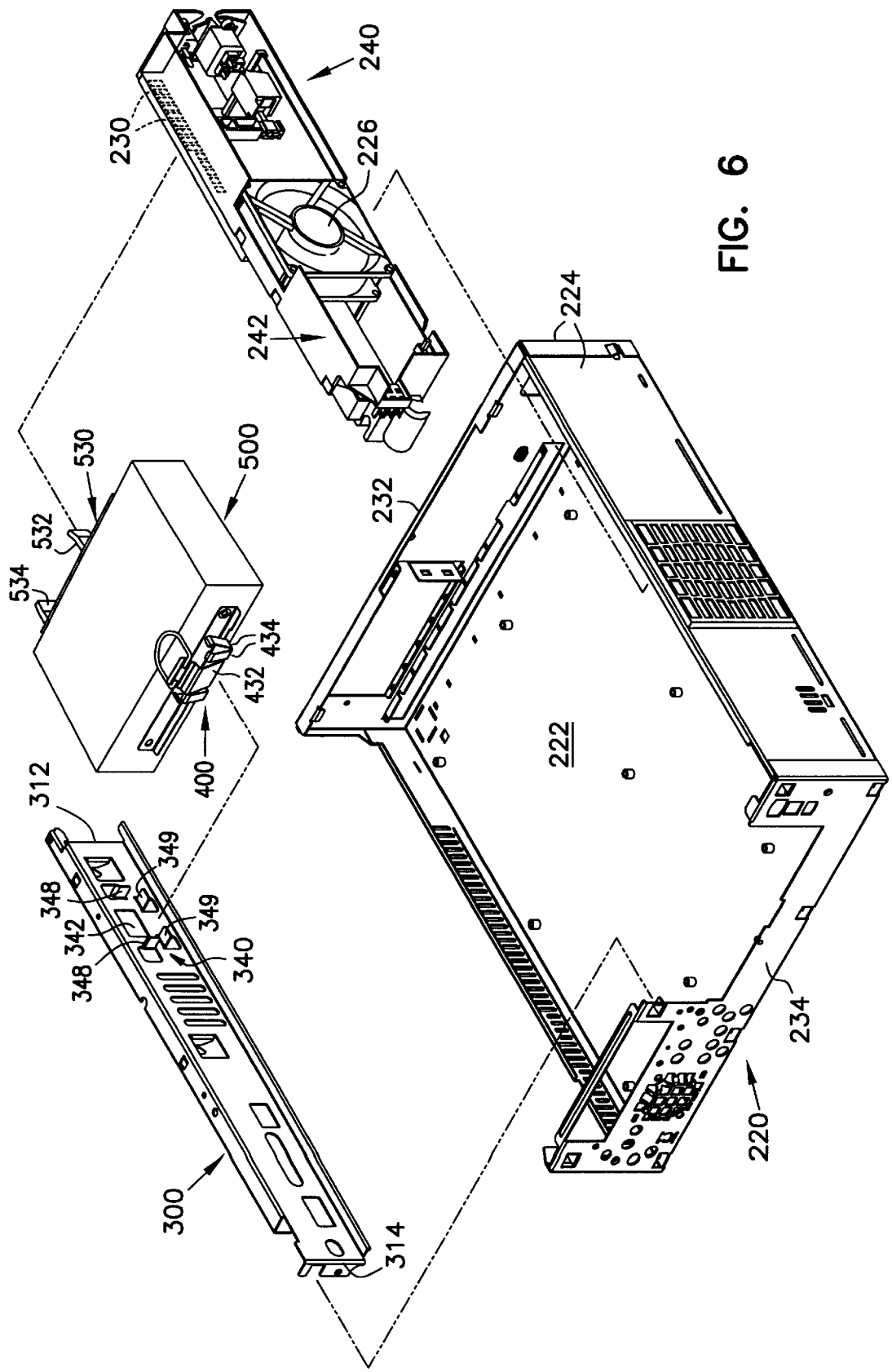
FIG. 6 is an exploded perspective view illustrating a computer constructed in accordance with another embodiment of the present invention.

FIG. 6 illustrates the assembly of the spring clip assembly 400 with the chassis 220 and the divider panel 300. To assemble, the divider panel 300 is placed into the chassis 220 with the first and second ends 312, 314 of the divider panel 300 aligned with the first and second side surfaces 232, 234 of the chassis 220, respectively. The first and second ends 312, 314 are coupled with the first and second side surfaces 232, 234 using, in one embodiment, a friction fit. Other fastening structures or components can also be used, such as threaded fasteners. Once the divider panel 300 is in place, the hard drive 500 is assembled into the computer.

First, the first and second support tabs 532, 534 of the support bracket 530 are inserted into the slots 230 of the power supply housing 242. The spring clip assembly 400 is guided toward the attachment features 340 of the divider panel 300. The spring clip assembly 400 guides the hard disk drive 500 into position. The plurality of tabs 434 are spring biased to press against the flanges 346 and the attachment panel 330. The first set of flanges 348 provide a resting surface for the hard disk drive spring clip assembly 400. The second set of flanges 349 assist in guiding the spring clip assembly 400 into securement with the divider panel 300. As the hard disk drive 500 is placed into position, the plurality of tabs 434 of the spring clip assembly 400 are deflected against the spring bias position. The deflection of the tabs 434 diminishes the need for tight mechanical tolerances for the spring clip assembly 400 and the attachment features 340 of the divider panel 300. As the disk drive 500 is placed into position, the spring bracket 432 engages with the spring bracket cut out 342 of the divider panel 300.

Once the hard disk drive 500 is assembled with the divider panel 300 and the chassis 220, the hard disk drive 500 is then coupled with a main printed circuit board (not shown) of the computer with a cable (not shown), as is known by those skilled in the art.

Advantageously, the hard disk drive can be easily removed from the computer without the use of any hand tools. Removal and installation of the disk drive without the use of hand tools and small screws saves time for the operator and is easy to use. In addition, since screws are no longer removed, the screws will not be misplaced during replacement of the disk drive, thereby eliminating frustration of dealing with small components. The spring clip self aligns during assembly and provides a natural pull direction and method for removal. Since the spring assembly can be operated with one hand and with limited force, the hard disk drive could be used by computer operators with limited dexterity or grip strength.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A removable computer component assembly for use with a computer, the component assembly comprising:

a computer component having a first side surface, a second side surface, a top surface and a bottom surface;

a support bracket coupled with the second side surface of the computer component; and a spring clip assembly coupled with the first side surface of the computer component, the spring clip comprising a spring bracket biasing away from the first surface of the computer component, the spring bracket having a first end fixed to the spring clip assembly and a non-fixed end, the spring bracket oriented so that the first end is located near the bottom surface of the computer component and the non-fixed end is located near the top surface of the computer component.

2. The computer component assembly as recited in claim 1, the support bracket further comprising first and second support tabs.

3. The computer component assembly as recited in claim 2, wherein at least one of the first and second support tabs have rounded edges.

4. The computer component assembly as recited in claim 1, the spring clip assembly further comprising a plurality of tabs having a spring bias where the plurality of tabs are integral with the spring clip assembly.

5. The computer component assembly as recited in claim 1, wherein the computer component comprises a disk drive.

6. The component assembly of claim 1, wherein the support bracket and the spring clip assembly are not connected to each other.

7. The component assembly of claim 1, wherein the spring bracket is oriented in vertical direction relative to the top and bottom surfaces of the computer component.

8. The component assembly of claim 1, wherein the spring clip assembly further comprises a plurality of tabs, at least one of the plurality of tabs has a spring bias in a first direction, at least one of the plurality of tabs has a spring bias in a second direction, and at least one of the plurality of tabs has a spring bias in a third direction.

9. The component assembly of claim 8, wherein the first direction is substantially perpendicular to the second direction, and wherein the third direction is substantially perpendicular to the second direction and is substantially opposed to the first direction.

10. A removable hard disk drive assembly comprising:
a hard disk drive having a first surface and a second surface;
a support bracket disposed proximate to one of the first surface or the second surface of the hard disk drive; and
a spring clip assembly coupled with the other of the first surface or the second surface of the computer component, the spring clip assembly comprising a spring bracket having a spring bias away from the first surface of the computer component to which the spring clip assembly is coupled;
wherein, the support bracket holds the second surface of the hard disk drive substantially in place while the first surface of the hard drive is rotated and the spring clip assembly is coupled to a panel of a computer chassis.

11. The hard disk drive as recited in claim 10, wherein the anchor member comprises a support bracket coupled with the hard disk drive.

12. The hard disk drive as recited in claim 11, the support bracket further comprising a first support tab and a second support tab.

13. The hard disk drive as recited in claim 10, the spring bracket assembly further comprising a plurality of tabs having a spring bias.

14. The hard disk drive as recited in claim 10, the spring bracket assembly further comprising a release mechanism.

15. The hard disk drive as recited in claim 14, wherein the release mechanism comprises a pull ring rotatably coupled with the spring bracket.

16. The hard disk drive as recited in claim 10, wherein the spring clip assembly comprises:
an elongate structure extending from a first end to a second end, the spring clip having first and second bracket portions being generally transverse to each other;
the second bracket portion having at least one aperture disposed therein, the aperture for receiving threaded fasteners therethrough;
a spring bracket coupled with the first bracket portion; and
a plurality of tabs coupled with the first bracket portion.

17. A personal computer having computer components therein, the computer comprising:
a chassis formed from a substantially rigid material, the chassis having a plurality of side surfaces including a first side surface and a second side surface, the chassis having at least one slot formed in a side surface;
a fan for drawing air through the slots formed in the side surface;
a divider panel disposed between the first side surface and the second side surface of the chassis, the divider panel having a plurality of attachment features integral therewith;
a disk drive having a first surface and a second surface;
a support bracket coupled with the second surface of the disk drive, the support bracket coupled with at least one slot of the chassis; and
a spring clip assembly coupled with the first surface of the disk drive, the spring clip assembly comprising a spring bracket having a spring bias away from the first surface of the disk drive, and a plurality of tabs, the spring bracket coupled with at least one of the plurality of attachment features of the divider panel, the spring bracket having a release mechanism for uncoupling the spring bracket from the divider panel so that the disk drive is released from the divider panel in a perpendicular direction relative to a top surface of the divider panel.

18. The computer as recited in claim 17, wherein the attachment features of the divider panel include a spring bracket cut out and first and second flanges, where the spring bracket is disposed in the spring bracket cut out and the plurality of tabs press against the second flanges.

19. The computer as recited in claim 17, wherein the support bracket has first and second support tabs integral therewith.

20. The computer as recited in claim 17, the computer further comprising a power supply having a power supply housing, the power supply housing having a plurality of slots therein, the slots for engaging the support bracket of the disk drive.

21. The computer as recited in claim 17, wherein the release mechanism comprises means for forcing the spring bracket towards the first surface of the disk drive.

* * * * *